(12) United States Patent
Orttung et al.

(10) Patent No.: US 8,073,719 B2
(45) Date of Patent: Dec. 6, 2011

(54) SYSTEM AND METHOD FOR CORE IDENTITY WITH PERSONAS ACROSS MULTIPLE DOMAINS WITH PERMISSIONS ON PROFILE DATA BASED ON RIGHTS OF DOMAIN

(75) Inventors: Mark Orttung, Menlo Park, CA (US); Matthew Mihic, San Francisco, CA (US); William Charles Mortimore, Jr., San Francisco, CA (US); Sean Handel, Moss Beach, CA (US)

(73) Assignee: Rearden Commerce, Inc., San Mateo, CA (US)

( * ) Notice: Subject to any disclaimer, the term of this patent is extended or adjusted under 35 U.S.C. 154(b) by 806 days.

(21) Appl. No.: 11/479,436

(22) Filed: Jun. 30, 2006

(65) Prior Publication Data

US 2008/0004918 A1    Jan. 3, 2008

(51) Int. Cl.
*G06Q 10/00* (2006.01)
*G06Q 50/00* (2006.01)
*G06Q 40/00* (2006.01)
(52) U.S. Cl. .................... 705/5; 705/1.1; 705/6; 705/40
(58) Field of Classification Search .................. 705/1.1, 705/5–6, 40
See application file for complete search history.

(56) References Cited

U.S. PATENT DOCUMENTS

| 4,862,357 A | * | 8/1989 | Ahlstrom et al. | ................. 705/6 |
| 5,513,126 A | | 4/1996 | Harkins et al. | |
| 5,832,454 A | | 11/1998 | Jafri et al. | |

(Continued)

FOREIGN PATENT DOCUMENTS

EP    1622060    2/2006

OTHER PUBLICATIONS

Reed, Dan, "More people find ways to squeeze fun into work trips; for many business travelers, taking family or friends on a trip at relatively low cost has become a handy job perk.", May 2003, USA Today, p. E12.*

(Continued)

*Primary Examiner* — Fadey Jabr
(74) *Attorney, Agent, or Firm* — Greenberg Traurig, LLP

(57) ABSTRACT

A method for core identity with personas across multiple domains with permissions on profile data based on rights of domain, is described. In one embodiment, the method is to be implemented on a system. In one embodiment the method comprises receiving travel selections for a first leg of an itinerary; receiving a selection of a first profile to be assigned for the travel selections of the first leg, the first profile to be selected from a group of profiles corresponding to a user; receiving travel selections for a second leg of the itinerary; receiving a selection of a second profile to be assigned for the travel selections of the second leg, the second profile to be selected from the group of profiles corresponding to the user; automatically determining whether to replace the first profile for the first leg of the itinerary with a selection of a separate profile from the group of profiles, the determination made based on a predetermined criteria; and billing for the first and second legs of the itinerary as a single multi-leg travel itinerary, and billing the first leg of the itinerary to a profile assigned for the first leg and billing the second leg of the itinerary to a profile assigned for the second leg.

17 Claims, 5 Drawing Sheets

U.S. PATENT DOCUMENTS

| | | | |
|---|---|---|---|
| 5,892,909 A | 4/1999 | Grasso et al. | |
| 5,966,658 A | 10/1999 | Kennedy et al. | |
| 5,991,735 A | 11/1999 | Gerace | |
| 6,009,408 A * | 12/1999 | Buchanan | 705/11 |
| 6,091,956 A | 7/2000 | Hollenberg | |
| 6,249,252 B1 | 6/2001 | Dupray | |
| 6,253,369 B1 | 6/2001 | Cloud et al. | |
| 6,292,830 B1 | 9/2001 | Taylor et al. | |
| 6,317,686 B1 | 11/2001 | Ran | |
| 6,336,072 B1 | 1/2002 | Takayama et al. | |
| 6,374,237 B1 | 4/2002 | Reese | |
| 6,397,191 B1 | 5/2002 | Notaini et al. | |
| 6,591,263 B1 | 7/2003 | Becker et al. | |
| 6,837,427 B2 | 1/2005 | Overhultz et al. | |
| 6,847,969 B1 | 1/2005 | Mathai et al. | |
| 6,853,982 B2 | 2/2005 | Smith et al. | |
| 6,901,424 B1 | 5/2005 | Wiinn | |
| 6,980,993 B2 | 12/2005 | Horvitz et al. | |
| 6,993,495 B2 | 1/2006 | Smith et al. | |
| 6,993,554 B2 * | 1/2006 | O'Donnell | 709/202 |
| 7,013,149 B2 | 3/2006 | Vetro et al. | |
| 7,013,290 B2 | 3/2006 | Ananian | |
| 7,035,811 B2 | 4/2006 | Gorenstein | |
| 7,072,886 B2 | 7/2006 | Salmenkaita et al. | |
| 7,124,024 B1 | 10/2006 | Adelaide et al. | |
| 7,139,978 B2 | 11/2006 | Rojewski | |
| 7,194,417 B1 | 3/2007 | Jones | |
| 7,280,823 B2 | 10/2007 | Ternullo et al. | |
| 7,283,970 B2 | 10/2007 | Cragun et al. | |
| 7,284,002 B2 | 10/2007 | Doss et al. | |
| 7,289,812 B1 | 10/2007 | Roberts et al. | |
| 7,296,017 B2 | 11/2007 | Larcheveque et al. | |
| 7,305,436 B2 | 12/2007 | Willis | |
| 7,330,112 B1 | 2/2008 | Emigh et al. | |
| 7,330,890 B1 | 2/2008 | Partovi et al. | |
| 7,346,668 B2 | 3/2008 | Willis | |
| 7,370,276 B2 | 5/2008 | Willis | |
| 7,376,735 B2 * | 5/2008 | Straut et al. | 709/224 |
| 7,394,900 B1 * | 7/2008 | Gerber et al. | 380/259 |
| 7,426,537 B2 | 9/2008 | Lee et al. | |
| 7,430,724 B2 | 9/2008 | Othmer | |
| 7,441,203 B2 | 10/2008 | Othmer et al. | |
| 7,565,615 B2 | 7/2009 | Ebert | |
| 7,634,463 B1 | 12/2009 | Katragadda et al. | |
| 7,672,881 B2 * | 3/2010 | Steury et al. | 705/34 |
| 2001/0029425 A1 | 10/2001 | Myr | |
| 2001/0034623 A1 | 10/2001 | Chung | |
| 2002/0007327 A1 * | 1/2002 | Steury et al. | 705/34 |
| 2002/0010604 A1 | 1/2002 | Block | |
| 2002/0026356 A1 | 2/2002 | Bergh et al. | |
| 2002/0049644 A1 | 4/2002 | Kargman | |
| 2002/0072938 A1 | 6/2002 | Black et al. | |
| 2002/0077871 A1 * | 6/2002 | Udelhoven et al. | 705/5 |
| 2002/0099613 A1 | 7/2002 | Swart et al. | |
| 2002/0116266 A1 | 8/2002 | Marshall | |
| 2002/0143655 A1 | 10/2002 | Elston et al. | |
| 2002/0161779 A1 | 10/2002 | Brieley | |
| 2002/0178034 A1 | 11/2002 | Gardner et al. | |
| 2003/0023499 A1 | 1/2003 | Das et al. | |
| 2003/0028390 A1 | 2/2003 | Stern et al. | |
| 2003/0033164 A1 * | 2/2003 | Faltings et al. | 705/1 |
| 2003/0050964 A1 | 3/2003 | Debaty et al. | |
| 2003/0065558 A1 | 4/2003 | Shaw et al. | |
| 2003/0115093 A1 * | 6/2003 | Lim et al. | 705/10 |
| 2003/0120530 A1 | 6/2003 | Casati et al. | |
| 2003/0126095 A1 | 7/2003 | Allen | |
| 2003/0135565 A1 | 7/2003 | Estrada | |
| 2003/0187705 A1 * | 10/2003 | Schiff et al. | 705/5 |
| 2003/0200146 A1 | 10/2003 | Levin et al. | |
| 2003/0208754 A1 | 11/2003 | Sridhar et al. | |
| 2003/0217332 A1 | 11/2003 | Smith et al. | |
| 2003/0220835 A1 | 11/2003 | Barnes, Jr. | |
| 2003/0229900 A1 | 12/2003 | Reisman | |
| 2004/0002876 A1 * | 1/2004 | Sommers et al. | 705/6 |
| 2004/0088107 A1 | 5/2004 | Seligmann | |
| 2004/0117275 A1 * | 6/2004 | Billera | 705/28 |
| 2004/0128156 A1 | 7/2004 | Beringer et al. | |
| 2004/0128196 A1 | 7/2004 | Shibuno | |
| 2004/0133463 A1 | 7/2004 | Benderev | |
| 2004/0141003 A1 | 7/2004 | Nivers et al. | |
| 2004/0193432 A1 | 9/2004 | Khalidi | |
| 2004/0215517 A1 | 10/2004 | Chen et al. | |
| 2004/0225540 A1 | 11/2004 | Waytena et al. | |
| 2004/0236616 A1 * | 11/2004 | Daughtrey | 705/5 |
| 2005/0010472 A1 | 1/2005 | Quatse et al. | |
| 2005/0038869 A1 | 2/2005 | Zimler et al. | |
| 2005/0043974 A1 * | 2/2005 | Vassilev et al. | 705/5 |
| 2005/0071245 A1 | 3/2005 | Norins et al. | |
| 2005/0138187 A1 | 6/2005 | Breiter et al. | |
| 2005/0203884 A1 | 9/2005 | Allen et al. | |
| 2005/0204276 A1 | 9/2005 | Hosea et al. | |
| 2005/0209772 A1 | 9/2005 | Yoshikawa et al. | |
| 2005/0227712 A1 | 10/2005 | Estevez et al. | |
| 2005/0228876 A1 | 10/2005 | Malik | |
| 2005/0273373 A1 * | 12/2005 | Walker et al. | 705/5 |
| 2005/0288973 A1 * | 12/2005 | Taylor et al. | 705/5 |
| 2006/0004511 A1 | 1/2006 | Yoshikawa et al. | |
| 2006/0020496 A1 * | 1/2006 | Azzarello et al. | 705/5 |
| 2006/0020565 A1 | 1/2006 | Rzevski et al. | |
| 2006/0041477 A1 | 2/2006 | Zheng | |
| 2006/0089194 A1 | 4/2006 | Joshi et al. | |
| 2006/0111956 A1 * | 5/2006 | Whitesage | 705/8 |
| 2006/0206412 A1 | 9/2006 | Van Luchene et al. | |
| 2006/0235754 A1 | 10/2006 | Walker et al. | |
| 2006/0247954 A1 * | 11/2006 | Hunt | 705/5 |
| 2006/0259632 A1 | 11/2006 | Crawford et al. | |
| 2006/0271552 A1 | 11/2006 | McChesnery et al. | |
| 2007/0016514 A1 | 1/2007 | A-Abdulqader et al. | |
| 2007/0071208 A1 | 3/2007 | Morris | |
| 2007/0073706 A1 * | 3/2007 | Ebie et al. | 707/10 |
| 2007/0143153 A1 * | 6/2007 | Ashby et al. | 705/5 |
| 2007/0162301 A1 * | 7/2007 | Sussman et al. | 705/1 |
| 2007/0162328 A1 | 7/2007 | Reich | |
| 2007/0198937 A1 | 8/2007 | Paris | |
| 2007/0276708 A1 * | 11/2007 | Steury et al. | 705/5 |
| 2008/0046298 A1 * | 2/2008 | Ben-Yehuda et al. | 705/6 |
| 2008/0287095 A1 | 11/2008 | Pousti | |
| 2008/0301166 A1 | 12/2008 | Sugiyama et al. | |
| 2009/0030609 A1 | 1/2009 | Orttung | |
| 2009/0030742 A1 | 1/2009 | Orttung | |
| 2009/0030769 A1 | 1/2009 | Orttung | |
| 2009/0101710 A1 | 4/2009 | Chakravarthy | |
| 2009/0167553 A1 | 7/2009 | Hong et al. | |

OTHER PUBLICATIONS

Sharkey, Joe, "Leisure activities are increasingly being fitted in to help make life on the road less of a grind.", Apr. 18, 2001, NEY YORK TIMES, p. C.6.*

"Future Business Travel in a "Wired" World", Jun. 1998, CMA Magazine, V.72 N.5, pp. 29.*

Fastie, Will et al., "Be Your Own Travel Agent", Jan. 6, 1998, PC Magazine, V.17 N. 1, pp. 177.*

Smith, Calvin et al., "The Talaris Services Business Language: A Case Study on Developing XML Vocabulaires Using the Universal Business Language," School of Information Management & Systems, University of California, Sep. 2002, pp. 1-16.

* cited by examiner

US 8,073,719 B2

SYSTEM AND METHOD FOR CORE IDENTITY WITH PERSONAS ACROSS MULTIPLE DOMAINS WITH PERMISSIONS ON PROFILE DATA BASED ON RIGHTS OF DOMAIN

BACKGROUND OF THE INVENTION

When a person makes a trip, for example, a business trip from San Francisco to New York, he may decide to take a side trip on personal business, such as, to continue the above example, a side trip from New York to Philadelphia to visit family, or perhaps a side trip to Boston to take in a baseball game. In most cases the traveler would find it advantageous to book this side trip as part of his business trip, and, depending on the company policies, he would then be required to reimburse the company for the costs incurred during the side trip (e.g., hotel and transportation). However, in some cases, the traveler may also prefer that the side trip is not visible to the company.

What is clearly needed is a system and method that allows a user to make one complex, multi-part booking or transaction in which some components may be purchased using one purchasing profile, and other components may be purchased using one or more different purchasing profiles.

What is further clearly needed in a multi-profile system as known to the inventor, where a user can have multiple profiles, is a system and method for automatic rights management during booking for the various profiles. Furthermore, what is clearly needed is a system and method for transferring rights or whole personas between different domains of use.

SUMMARY

A method for core identity with personas across multiple domains with permissions on profile data based on rights of domain, is described. In one embodiment, the method is to be implemented on a system. In one embodiment the method comprises receiving travel selections for a first leg of an itinerary; receiving a selection of a first profile to be assigned for the travel selections of the first leg, the first profile to be selected from a group of profiles corresponding to a user; receiving travel selections for a second leg of the itinerary; receiving a selection of a second profile to be assigned for the travel selections of the second leg, the second profile to be selected from the group of profiles corresponding to the user; automatically determining whether to replace the first profile for the first leg of the itinerary with a selection of a separate profile from the group of profiles, the determination made based on a predetermined criteria; and billing for the first and second legs of the itinerary as a single multi-leg travel itinerary, and billing the first leg of the itinerary to a profile assigned for the first leg and billing the second leg of the itinerary to a profile assigned for the second leg.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
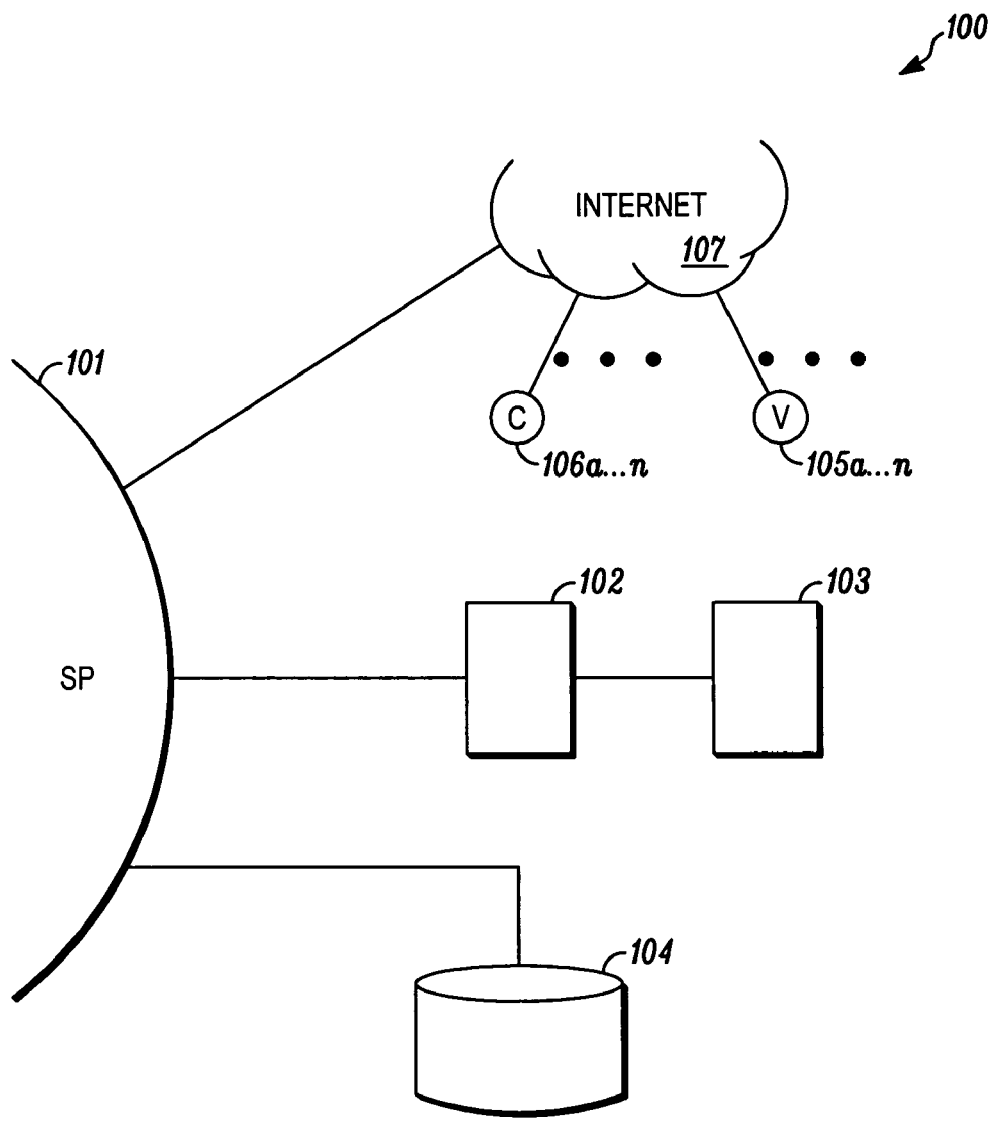
FIG. 1 shows an overview of an exemplary system in accordance with one embodiment.

FIG. 1 shows an overview of an exemplary system 100 in accordance with one embodiment. Electronic service portal 101 is running on server 102, which contains software instance 103. Portal 101 may be connected, typically, to Internet 107. Also connected typically through the Internet are vendors 105a-n (also known as service providers) and customers 106a-n. In some cases any or all of these connections may not be via the Internet, but rather through some dedicated or alternative means of connection, many varieties of which are known in the art. These various additionally possible well-known systems and methods of connection are not a main part of the novel art of this invention and, for purposes of clarity and simplicity, are not shown here.

Figure 2:
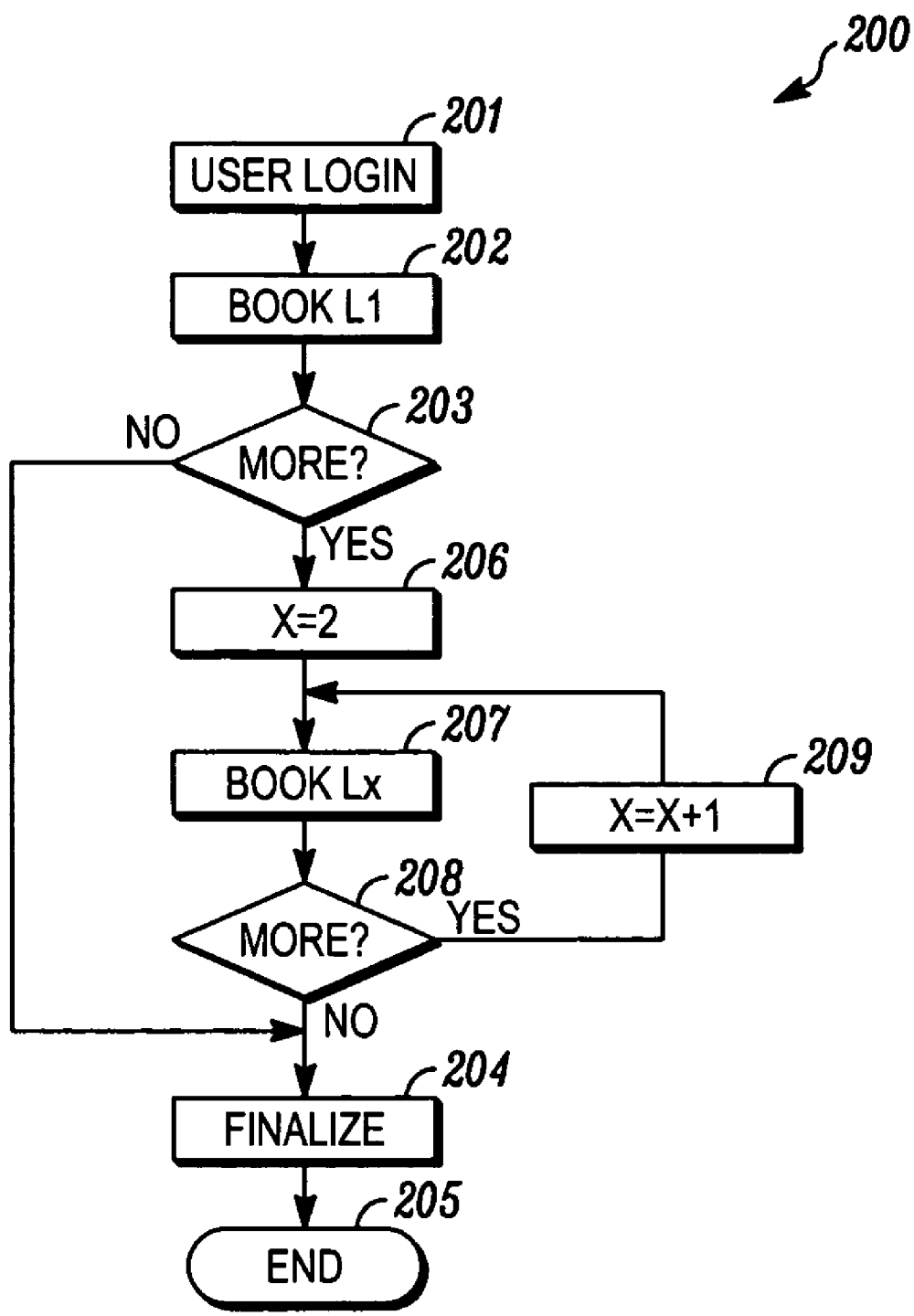
FIG. 2 shows the process flow of an exemplary system, in accordance with one embodiment, for booking multi-part transactions.

FIG. 2 shows the process flow 200 of an exemplary system, in accordance with one embodiment, for booking multi-part transactions. In process 201 a user logs in. He then books the first leg L1 of a transaction in process 202. In this example, the multi-part transaction may be for travel reservations, with multiple flights, hotel rooms, and rental cars. However, in other cases, the multi-part transactions may concern any of a great variety of services and products that are not necessarily limited to travel and transportation. In process 203, the process branches, depending on whether the user wishes to book more legs of the transaction.

If there are no more legs (no), the process moves to process 204, where the transaction is finalized (including payment terms, delivery if appropriate, corporate policy status and description, etc.), and then to process 205, where the process ends. If, however, the user wishes to book more legs of the transaction (yes), the process moves to process 206, where x is set at 2, so in process 207 the user may book leg Lx, where x=2, of the transaction.

The process then moves to process 208, where it again branches, with the same alternatives are process 203—that is, to finalize the transaction or to book more transaction legs. If the user again wishes to book more transactions (yes), the process moves to process 209, where x increments to x+1, and loops back to process 207, where the user again books leg Lx. This process continues until, in process 208, the user no longer wishes to book more legs of the transaction (no). The process then moves to process 204 and proceeds as described above.

Figure 3:
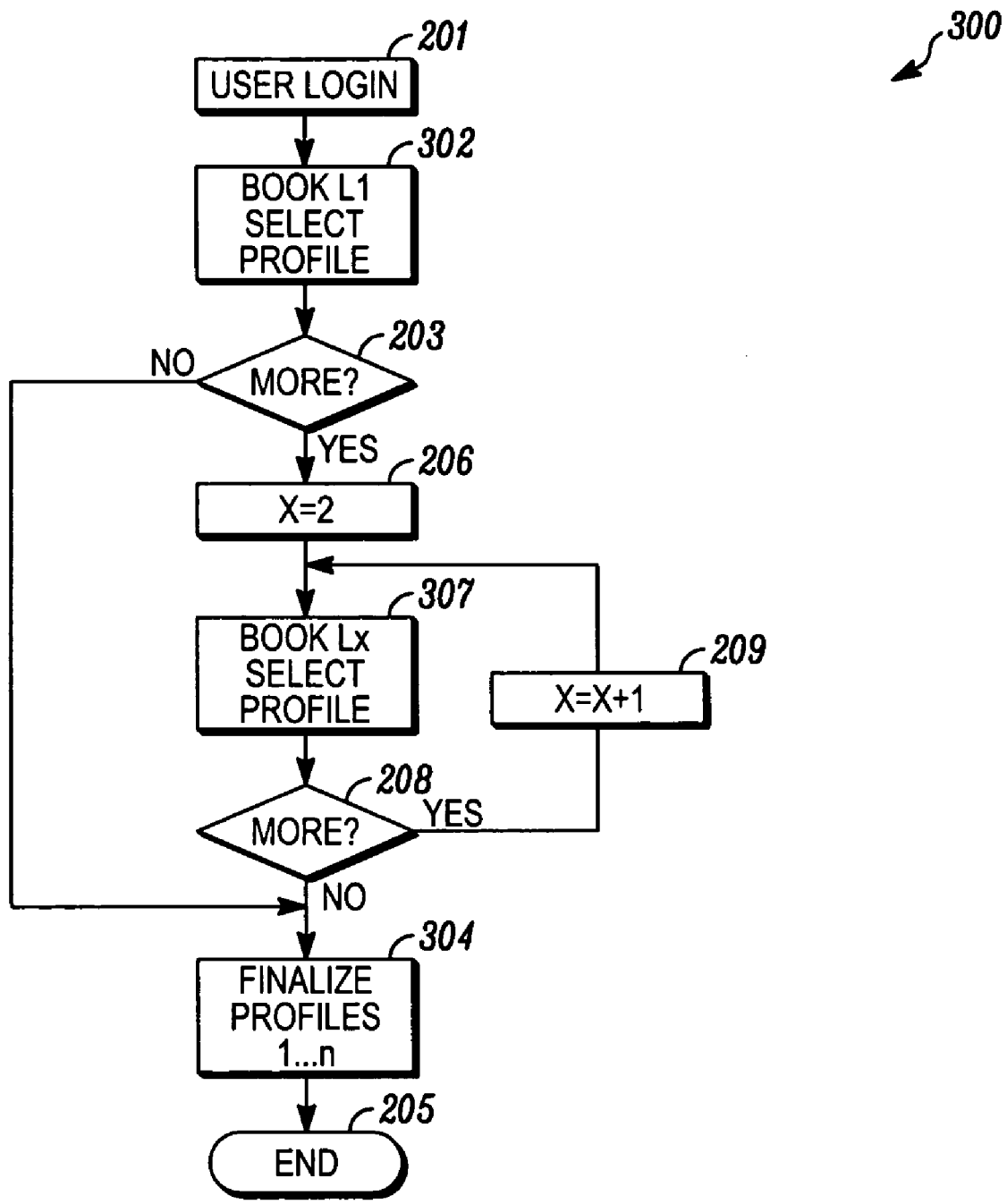
FIG. 3 shows the process flow of a system according to an exemplary embodiment, in which each user may have multiple profiles.

FIG. 3 shows the process flow of a system 300 according to an exemplary embodiment, in which each user may have multiple profiles. In process 201 a user logs in. He then books the first leg L1 of a transaction in process 302 and he also selects the preferred profile for this leg. In this example, again, the multi-part transaction may be for travel reservations, with multiple flights, hotel rooms, and rental cars. However, in other cases, the multi-part transactions may concern any of a great variety of services and products that are not necessarily limited to travel and transportation.

In process 203, the process branches, depending on whether the user wishes to book more legs of the transaction. If there are no more legs (no), the process moves to process 304, where the transaction is finalized (see below for a more detailed description of the processes of process 304), and then to process 205, where the process ends. If, however, the user wishes to book more legs of the transaction (yes), the process moves to process 206, where x is set at 2, so in process 307 the user may book leg Lx, where x=2, of the transaction. In process 307, when the user selects the next leg Lx of the transaction, he also selects the preferred profile for this leg.

The process then moves to process 208, where it again branches, with the same alternatives are process 203—that is, to finalize the transaction or to book more transaction legs. If the user again wishes to book more transactions (yes), the process moves to process 209, where x increments to x+1, and loops back to process 307, where the user again books leg Lx and selects the preferred profile. This process continues until, in process 208, the user no longer wishes to book more legs of the transaction (no). The process then moves to process 304. In process 304, when the user finalizes the entire transaction, he then finalizes the details for each leg of the transaction by choosing a profile 1-$n$ to use for that part.

Each profile contains information about payment mechanism, corporate policy applicability and terms, service preferences such as preferred rental car type (midsize, etc), loyalty program information (e.g. United frequent flyer program number), type of fare to book (first class, coach class unrestricted, etc) and other information. However, the entire transaction is booked as a whole, thus accruing to the user the savings of one multi-leg flight, for example, and the convenience of one set of reservations.

Figure 4:
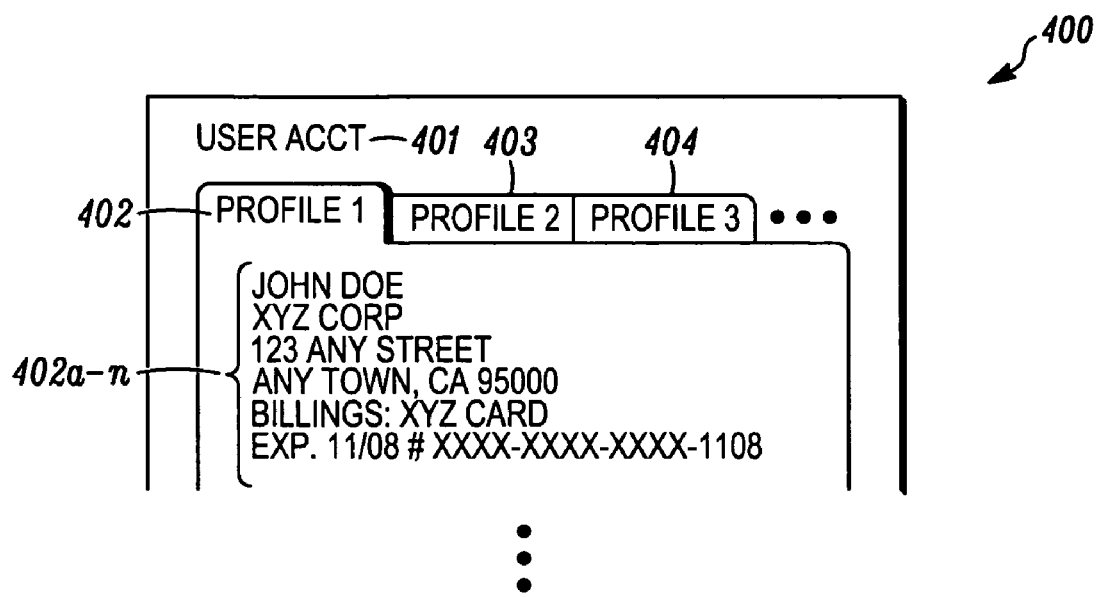
FIG. 4 shows an overview of an exemplary embodiment of a system for organizing user accounts.

FIG. 4 shows an overview of an exemplary embodiment of a system 400 for organizing user accounts. User account 401 may have multiple profiles, such as Profile 1 402, Profile 2 403, Profile 3 404, etc. Each profile contains a set of profile-specific data such as, for example, profile data 402$a$-$n$. Typically, all profiles may pertain to the same person, in this example user John Doe, but other profile details may differ, such as the organization, in this example XYZ Corp., the address, the billing details, etc. For example, one profile may be the corporate account of the user; another profile may be the personal American Express account, while a third profile may his AAA account, and so on.

Figure 5:
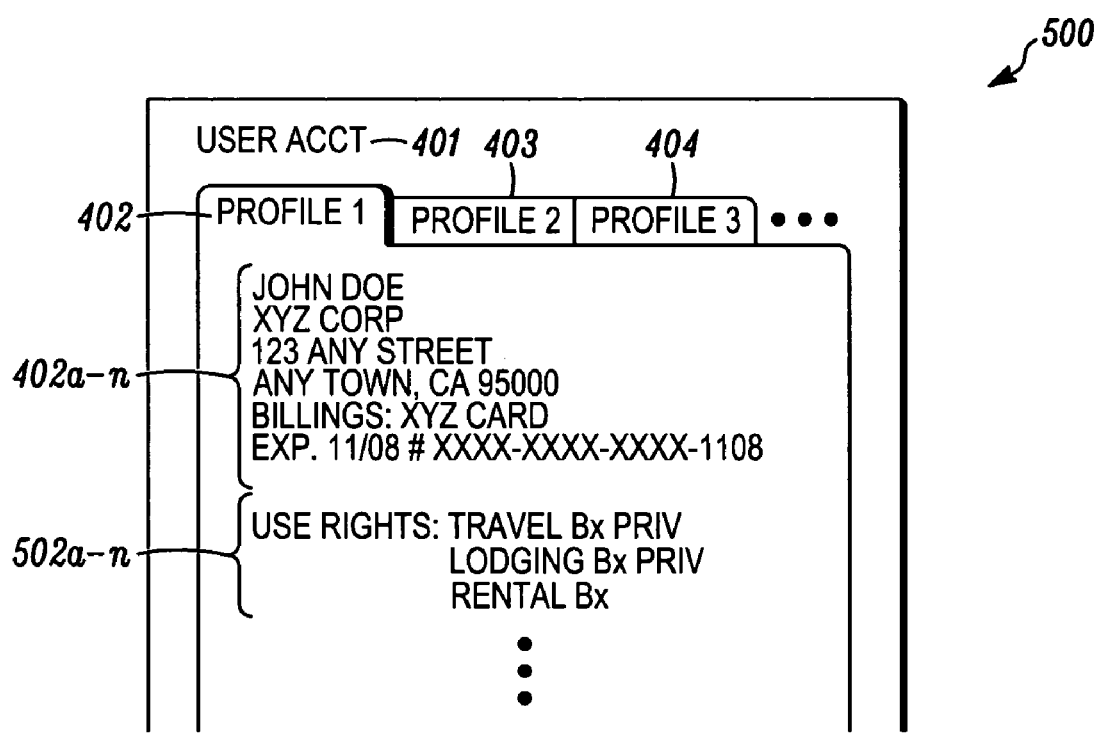
FIG. 5 shows an overview of an exemplary embodiment of a system for organizing user accounts, in accordance with one embodiment.

FIG. 5 shows an overview of an exemplary embodiment of a system 500 for organizing user accounts. User account 401 has multiple profiles Profile 1 402, Profile 2 403, Profile 3 404, etc. In this example, certain profiles may allow use for business and private expenses, while other profiles may allow use solely for business expenses. Profile 1 402 shows the profile data 402$a$-$n$, plus additional rights data 502$a$-$n$. In this example the profile examples shown are limited to travel, but this example should in no way be construed as a limitation to the invention. Many other uses can be found, including but not be limited to personal services, shipping services, financial services, purchasing and preparation services, etc.

In this example, the rights shown allow use of the account in Profile 1 402 for business and private travel and lodging, but for business only for rental cars. This last rights limitation may be, for example, due to insurance coverage available only for business usage, instead of for both business and personal use. Thus, to limit their potential liability, the company may decide not to extend personal use rights to rental cars.

Additional profiles may be used, for example, in cases where a consulting company is doing work for a client. In such an exemplary case, the client company may extend rights for travel expenses to the consulting personnel working for the client. In some cases, it may be more cost-effective for the consulting company to book travel arrangements for its personnel who are consulting with the client through the client corporation than to book its own travel arrangements and pass the costs on to the client. In some cases, the same flight may be booked through a different contract, which could result in lower prices. Or the same hotel, booked through the client's account, may cost less, due to the client's volume, compared to the consulting company's account. In other cases, certain functions or features may be less expensive or more readily available. In such cases, it may be necessary to override bookings under airline profile or credit card profile, etc. For example, if a traveler books a trip under his credit card, due to a promotion, it may be less expensive than booking it with the airline itself.

Price determinations may be accomplished by comparing pricing using various profiles, such as Profile 2 403, Profile 3 404, etc. In addition, in some cases the person's relationship with a supplier can be embodied through one or more of these profiles, allowing the user to accrue specific benefits as part of that relationship when using that profile to make purchases or reservations. For example, the user's business profile may contain his loyalty program account information which entitles him to a free upgrade on all rental cars when using this profile.

Figure 6:
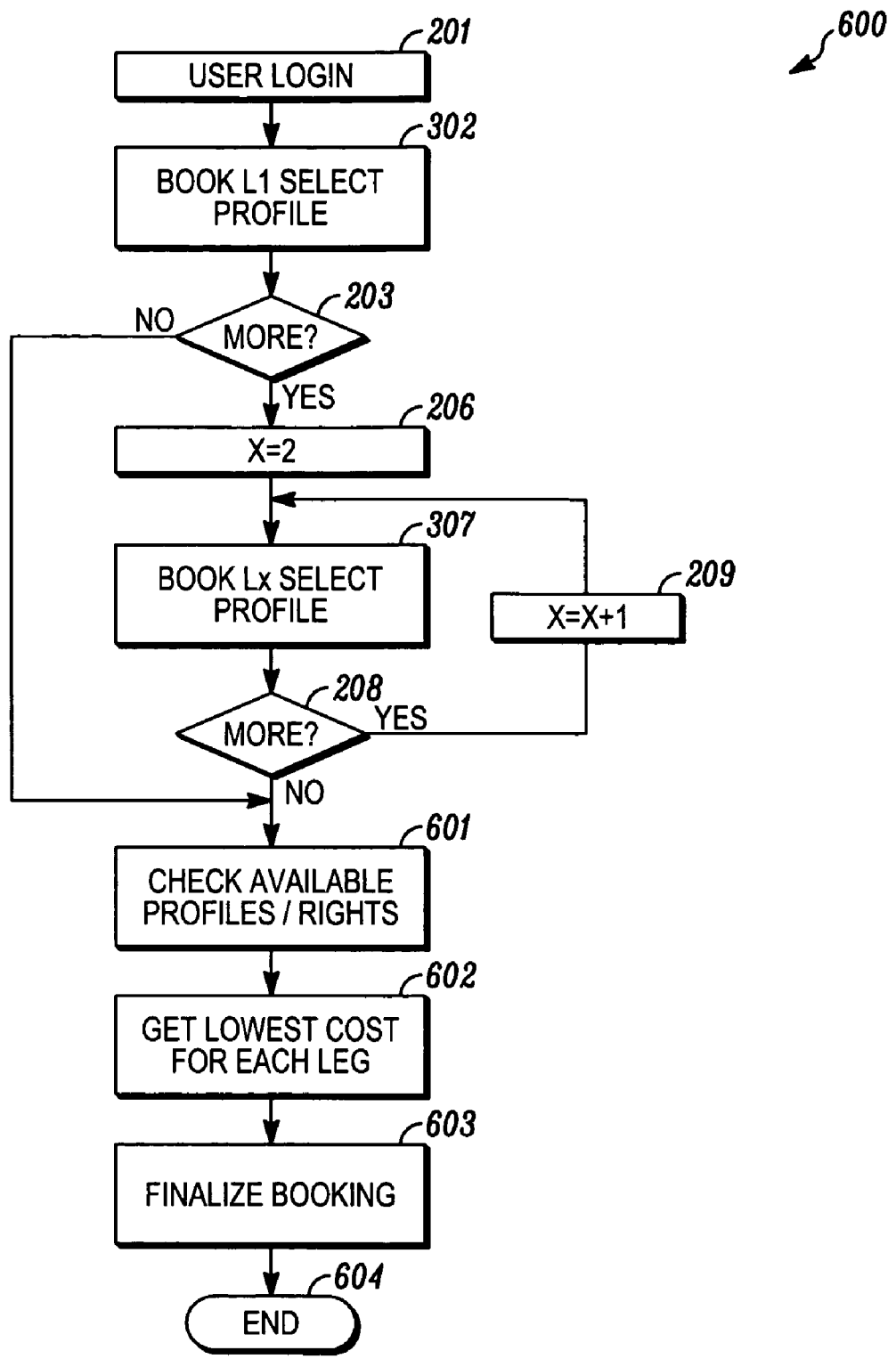
FIG. 6 shows the process flow of a system according to an exemplary embodiment.

FIG. 6 shows the process flow of a system 600 according to an exemplary embodiment of the current invention. In process 601 a user logs in. He then books the first leg L1 of a transaction in process 602 and he also selects the preferred profile for this leg. In this example, again, the multi-part transaction may be for travel reservations, with multiple flights, hotel rooms, and rental cars.

However, in other cases, the multi-part transactions may concern any of a great variety of services and products that are not necessarily limited to travel and transportation. In process 603, the process branches, depending on whether the user wishes to book more legs of the transaction.

If there are no more legs (no), the process moves to process 611, where the transaction is finalized as described below. If, however, the user wishes to book more legs of the transaction (yes), the process moves to process 606, where x is set at 2, so in process 307 the user may book leg Lx, where x=2, of the transaction. In process 607, when the user selects the next leg Lx of the transaction, he also selects the preferred profile for this leg.

The process then moves to process 608, where it again branches, with the same alternatives are process 603—that is, to finalize the transaction or to book more transaction legs. If the user again wishes to book more transactions (yes), the process moves to process 609, where x increments to x+1, and loops back to process 607, where the user again books leg Lx and selects the preferred profile. This process continues until, in process 608, the user no longer wishes to book more legs of the transaction (no).

The process then moves to process 611, where, when the booking entry is completed, the system goes back and selects available profiles and rights, if such profiles may be substituted for profiles the user selected, if they would result in a better cost, better quality, better service, or combinations thereof for the selected goods and services.

This process of price optimization may require a repetitive execution, because some bookings may affect other bookings. For example, an airline may have a promotion on certain hotel rooms, so by changing the airline through a certain account, a different hotel may need to be selected. In some cases, such changes may also require a reconfirmation with the user that these changes are acceptable to him; in other cases, these changes may be required by the company rules, for example, as a cost savings. Once the lowest bidders are found for each leg in process 612, a new package is assembled, and the booking is finalized in process 613, upon which the process ends in process 614.

It is clear that many modifications and variations of this invention may be made by one skilled in the art without departing from the spirit of the novel art of this disclosure. For example, a user may wish to include in his profiles a credit card for his college-age child, in which case the person in the profile would be, for example, Susan Doe, while the credit card and address details would be the same.

At least some embodiments, and the different structure and functional elements described herein, can be implemented using hardware, firmware, programs of instruction, or combinations of hardware, firmware, and programs of instructions.

In general, routines executed to implement the embodiments can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Some aspects can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

In various embodiments, hardwired circuitry can be used in combination with software instructions to implement the embodiments. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope of the invention as set forth in the following claims. The specification and drawings are, accordingly, to be regarded in an illustrative sense rather than a restrictive sense.

What is claimed is:

1. A method comprising:
   receiving, in an electronic service portal computing device, inputs to book a single multi-leg travel itinerary for a user, including:
   receiving travel selections for a first leg of the single multi-leg travel itinerary;
   receiving a selection of a first profile to be assigned for the travel selections for the first leg, the first profile to be selected from a group of profiles corresponding to the user, the first profile containing information about a first payment mechanism;
   receiving travel selections for a second leg of the single multi-leg travel itinerary; and
   receiving a selection of a second profile to be assigned for the travel selections for the second leg, the second profile to be selected from the group of profiles corresponding to the user, the second profile containing information about a second payment mechanism, wherein the first profile corresponds to an employment of the user, and the second profile corresponds to a personal use of the user, and wherein payment information of the first profile corresponds to an organization separate from the user and payment information of the second profile corresponds to the user;
   automatically determining an optimum price alternative for each leg of the single multi-leg travel itinerary for the user and prompting the user for acceptance of the optimum price alternative;

if the optimum price alternative is unacceptable to the user, automatically determining another optimum price alternative excluding the optimum price alternative and presenting the another optimum price alternative to the user until an acceptance by the user is received;

automatically determining, by the electronic service portal computing device, whether to replace the first profile for the first leg of the itinerary with a selection of a separate profile from the group of profiles, the determination made based on a predetermined criterion; and billing, by the electronic service portal computing device, the first leg of the single multi-leg travel itinerary according to first information about a payment mechanism contained in a profile assigned for the first leg and the second leg of the single multi-leg travel itinerary according to second information about a payment mechanism contained in a profile assigned for the second leg.

2. The method of claim 1, further comprising:
automatically determining whether to replace the second profile for the second leg of the itinerary with a selection of a separate profile from the group of profiles, the determination made based on the predetermined criterion.

3. The method of claim 2, wherein the predetermined criterion includes a cost criterion.

4. The method of claim 2, wherein the predetermined criterion includes a service rating criterion.

5. The method of claim 2, wherein the predetermined criterion includes a quality rating criterion.

6. The method of claim 2, wherein the predetermined criterion includes predetermined entity rules.

7. The method of claim 2, wherein the predetermined criterion includes a combination of one or more of a cost criterion, a service rating criterion, and a quality rating criterion.

8. The method of claim 2, wherein the automatically determining whether to replace the first profile includes prompting the user for acceptance of replacement of the first profile.

9. The method of claim 2, further comprising:
receiving travel selections for a third leg of the itinerary;
receiving a selection of a profile to be assigned for the travel selections for the third leg;
automatically determining whether to replace the profile for the third leg of the itinerary with a selection of a separate profile from the group of profiles, the determination made based on the predetermined criterion; and
billing for the first, second, and third legs of the itinerary as a single multi-leg travel itinerary, and billing the third leg of the itinerary to a profile assigned for the third leg.

10. The method of claim 2, wherein the first and second legs of the itinerary include one or more of a flight reservation, a hotel reservation, and a vehicle rental reservation.

11. The method of claim 1, wherein the first and second profiles include at least one of payment information, predetermined service preferences, loyalty program information, and a predetermined level of fare to be booked.

12. The method of claim 11, wherein the predetermined level of fare to be booked includes a level of fare selected from a group comprising two or more of first class, business class, coach class, economy class, and unrestricted.

13. A tangible computer readable non-transitory medium having stored thereon a set of instructions, which when executed on a computer, cause the computer to perform a method, the method comprising:
receiving, in an electronic service portal, inputs to book a single multi-leg travel itinerary for a user, including:
receiving travel selections for a first leg of the single multi-leg travel itinerary;
receiving a selection of a first profile to be assigned for the travel selections for the first leg, the first profile to be selected from a group of profiles corresponding to the user, the first profile containing information about a first payment mechanism;
receiving travel selections for a second leg of the single multi-leg travel itinerary; and
receiving a selection of a second profile to be assigned for the travel selections for the second leg, the second profile to be selected from the group of profiles corresponding to the user, the second profile containing information about a first payment mechanism, wherein the first profile corresponds to an employment of the user, and the second profile corresponds to a personal use of the user, and wherein payment information of the first profile corresponds to an organization separate from the user and payment information of the second profile corresponds to the user;
automatically determining an optimum price alternative for each leg of the single multi-leg travel itinerary for the user and prompting the user for acceptance of the optimum price alternative;
if the optimum price alternative is unacceptable to the user, automatically determining another optimum price alternative excluding the optimum price alternative and presenting the another optimum price alternative to the user until an acceptance by the user is received;
automatically determining, by the electronic service portal, whether to replace the first profile for the first leg of the itinerary with a selection of a separate profile from the group of profiles, the determination made based on a predetermined criterion; and
billing, by the electronic service portal, the first leg of the single multi-leg travel itinerary according to first information about a payment mechanism contained in a profile assigned for the first leg and the second leg of the single multi-leg travel itinerary according to second information about a payment mechanism contained in a profile assigned for the second leg.

14. The computer readable medium of claim 13, wherein the predetermined criterion includes a combination of one or more of a cost criterion, a service rating criterion, and a quality rating criterion.

15. The computer readable medium of claim 14, wherein the automatically determining whether to replace the first profile includes prompting the user for acceptance of replacement of the first profile.

16. The computer readable medium of claim 13, further comprising:
receiving travel selections for a third leg of the itinerary;
receiving a selection of a profile to be assigned for the travel selections for the third leg;
automatically determining whether to replace the profile for the third leg of the itinerary with a selection of a separate profile from the group of profiles, the determination made based on the predetermined criterion; and
billing for the first, second, and third legs of the itinerary as a single multi-leg travel itinerary, and billing the third leg of the itinerary to a profile assigned for the third leg.

17. A system comprising:
a memory to store instructions; and
at least one processor to execute the instructions to:
receive inputs to book a single multi-leg travel itinerary for a user, via receiving travel selections for a first leg of the single multi-leg travel itinerary, and receiving travel selections for a second leg of the single multi-leg travel itinerary; and receiving an assignment of the travel selections for the first leg to a first profile and an assignment of the travel selections for the second leg to a second profile, the first profile containing information about a first payment mechanism, and the second profile containing information about a second payment mechanism, wherein the first profile corresponds to an employment of the user, and the second profile corresponds to a personal use of the user, and wherein payment information of the first profile corresponds to an organization separate from the user and payment information of the second profile corresponds to the user;

automatically determine an optimum price alternative for each leg of the single multi-leg travel itinerary for the user and prompt the user for acceptance of the optimum price alternative;

if the optimum price alternative is unacceptable to the user, automatically determine another optimum price alternative excluding the optimum price alternative and presenting the another optimum price alternative to the user until an acceptance by the user is received;

automatically determine whether to replace the profile assigned to the first leg of the itinerary with a selection of a separate profile from the group of profiles, the determination made based on a predetermined criterion; and bill the first leg of the single multi-leg travel itinerary according to first information about a payment mechanism provided in a profile assigned to the first leg, and the second leg of the single multi-leg travel itinerary according to second information about a payment mechanism provided in a profile assigned to the second leg.

\* \* \* \* \*